Dec. 22, 1925.                            1,566,686
J. F. O'CONNOR
HAND BRAKE
Filed July 23, 1923     2 Sheets-Sheet 1
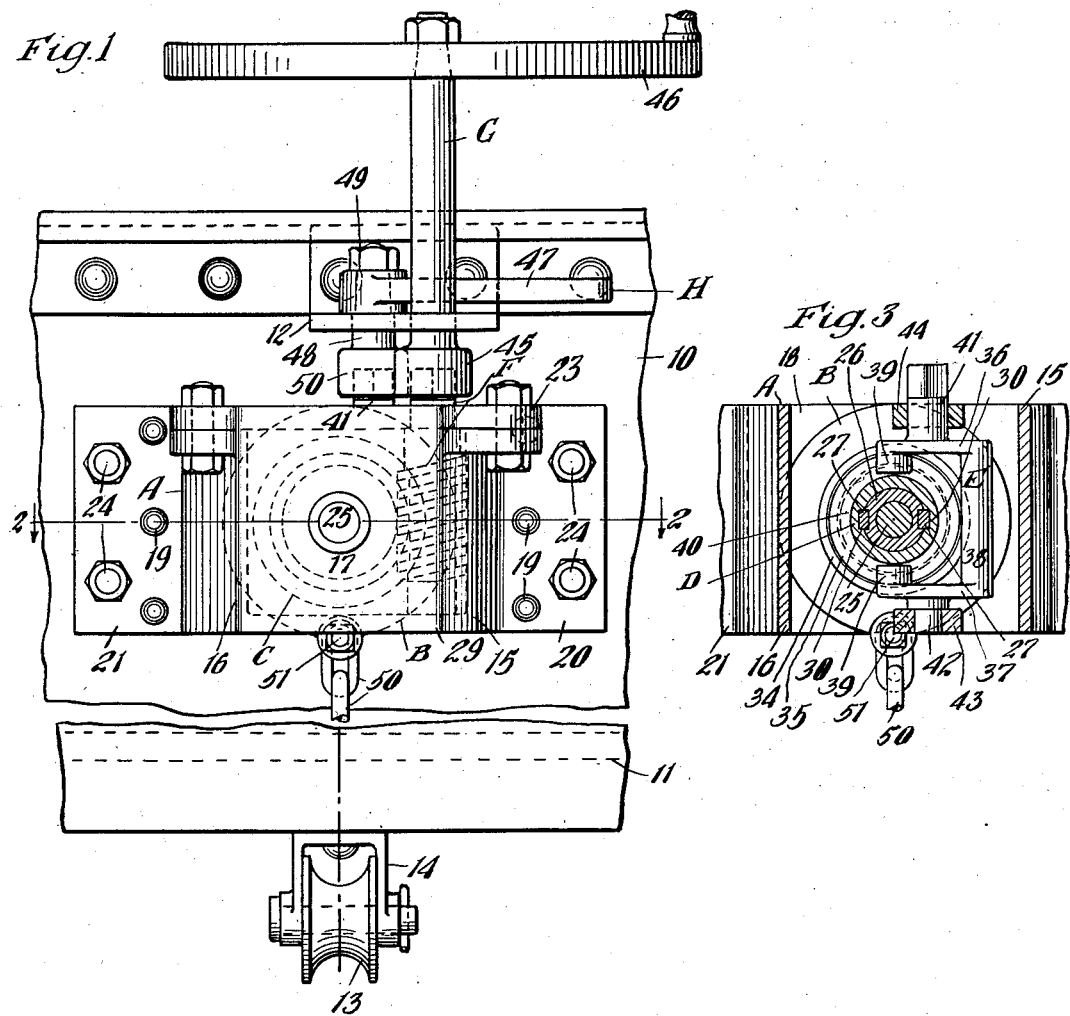
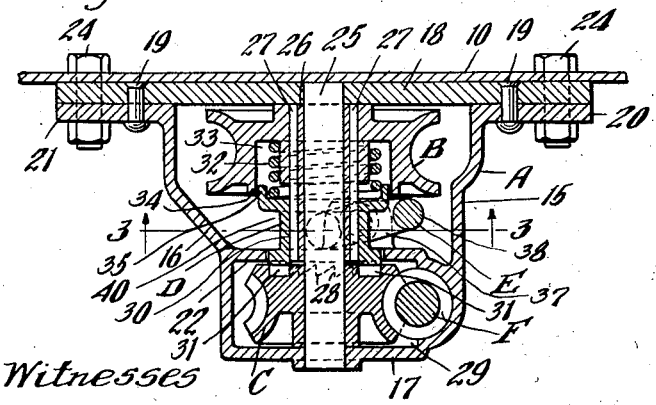
Witnesses
Wm. Geiger
Inventor
John F. O'Connor
By George I. Haight
His Atty.

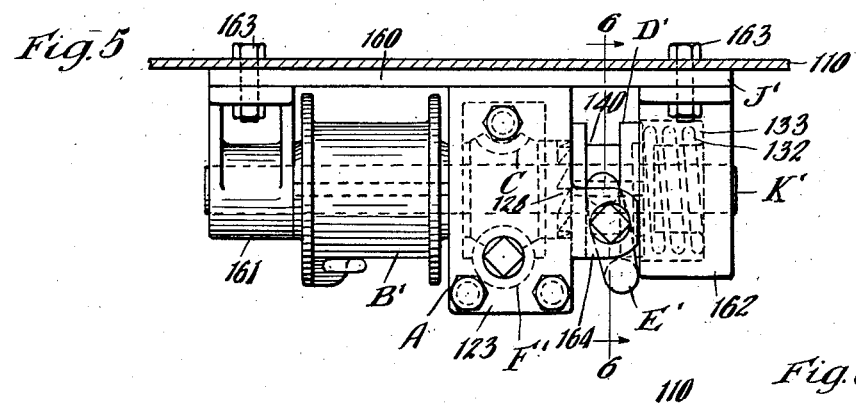
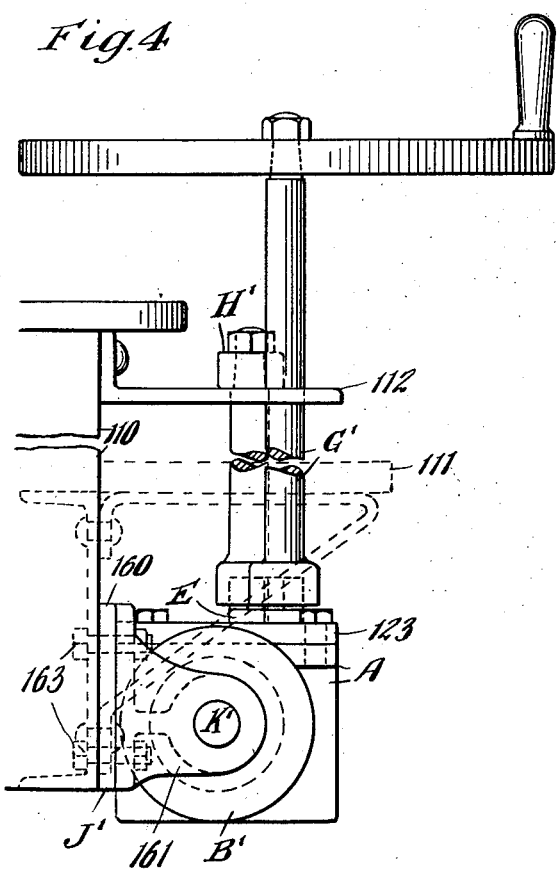
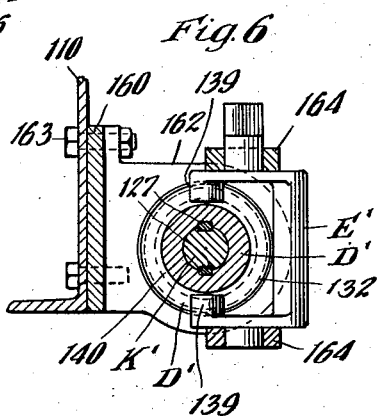

Patented Dec. 22, 1925.

1,566,686

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE.

Application filed July 23, 1923. Serial No. 653,112.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to hand brakes.

One object of this invention is to provide an efficient hand brake of the worm and worm wheel type, wherein means is provided for quickly disconnecting the brake winding mechanism from the operating means to effect instantaneous release of the brakes.

Another and more specific object of the invention is to provide a hand brake of the vertical staff type, including a brake chain winding drum, together with worm and worm wheel operating means therefor, wherein an automatically operating clutch is provided for connecting the operating means with the drum, together with manually operated means for disengaging said clutch to effect quick release of the brakes.

Other objects and advantages of the invention will more clearly appear from the description and claims hereinafter following.

In the drawings forming a part of this specification, Fig. 1 is an end elevational view of a portion of a gondola freight car, showing my improvements in connection therewith, parts being broken away to better accommodate the view to the sheet. Fig 2 is a horizontal, transverse, sectional view corresponding substantially to the line 2—2 of Fig. 1. Fig. 3 is a vertical, sectional view, corresponding substantially to the line 3—3 of Fig. 2. Fig. 4 is a side, elevational view of the end portion of a gondola freight car, showing a different embodiment of the invention in connection therewith, parts being broken away to better accommodate the view to the sheet. Fig. 5 is a horizontal, sectional view through the end wall of the car, showing the improved mechanism illustrated in Fig. 4, in top plan view, the brake staff and clutch operating member being omitted. And Fig. 6 is a vertical, transverse, sectional view corresponding substantially to the line 6—6 of Fig. 5

In said drawings, referring first to the construction illustrated in Figs. 1, 2 and 3, 10 denotes the end wall of a gondola freight car, 11 the usual brakeman's platform, 12 the upper bearing bracket for the brake mechanism; and 13 the chain guide sheave, rotatably mounted in a bracket 14 fixed to the under side of the bottom of the car.

The improved brake, as shown in Figs. 1, 2 and 3 comprises, broadly, a housing A; a brake drum B; a worm wheel C; a clutch member D; a clutch shifting member E; a worm F; a brake staff G; and a release member H.

The housing A includes vertically disposed side walls 15 and 16, a front wall 17, and a rear wall 18 in the form of a plate attached to the rear of the housing proper by means of rivets 19—19 extending through laterally projecting flanges 20 and 21 at the rear sides of the walls 15 and 16, respectively. The housing A is also provided with a transverse, vertically extending web 22 disposed parallel to the front wall 17, thereby providing a chamber in which the worm wheel C and the worm F are housed. The chamber of the housing A is closed by a cover plate 23, secured thereto in any suitable manner, preferably by bolts extending through lugs on the cover plate and housing proper, respectively. The housing A is suitably secured to the end wall 10 of the car by bolts 24 passing through the flanges 20 and 21, the plate 18 and end wall 10.

The chain winding drum B is rotatably mounted upon a shaft 25 having its opposite ends fixed within the front wall 17 and the plate 18 of the housing A and disposed centrally between top and bottom thereof. An elongated sleeve 26 directly rotatable on the shaft 25, supports the drum, the sleeve being fixedly secured to the drum by longitudinally extending, opposed keys 27.

The worm wheel C is rotatably mounted directly on the shaft 25 and is disposed within the chamber defined by the front wall 17 and the web 22 of the housing. On the side adjacent the web 22, the worm wheel C is provided with clutch teeth 28 adapted to co-act with the clutch member D. The worm wheel C co-operates with a vertically disposed worm F having its upper and lower ends journaled respectively in the cover plate 23 and the bottom wall 29 of the housing. The bearing member at the upper end portion of the worm is extended outwardly beyond the cover plate 23 and is formed of square cross-section as indicated at 29 adapted to cooperate with the staff G.

The clutch member D is in the form of a collar slidably mounted on the sleeve 26, the same being provided with opposed, interior, longitudinally extended slots 30, adapted to respectively receive the keys 27, whereby the collar is splined for sliding movement on the sleeve 26 and compelled to rotate in unison therewith. Adjacent the worm wheel C, the collar D is provided with a series of clutch teeth 31 adapted to co-operate with the teeth 28 of the worm wheel C. The clutch member D is yieldingly held in engagement with the worm wheel C by a coiled spring 32 interposed between the same and the drum B, the drum B being provided with a recess 33 adapted to receive the spring and also the adjacent end of the collar D for a sliding movement. As clearly shown in Fig. 2, the drum B is provided with an integral cylindrical hub portion 34 disposed within the recess 33 and adapted to extend into the coiled spring 32 to hold the same in properly centered position. The sliding clutch member D is also provided with a cylindrical flange 35 at its rear side, adapted to embrace the end of the spring to assist in holding the same in properly centered position.

The clutch shift member or shipper lever E is in the form of a fork having upper and lower arms 36 and 37 and an integral connecting portion 38. At their free ends, the arms 36 and 37 are provided with cylindrical lugs 39, adapted to engage within a peripheral groove 40 of the clutch member D. Midway between the opposite ends of the arms 36 and 37 are formed pivot extensions 41 and 42 extending upwardly and downwardly therefrom. The extension 42 has its lower end reduced and is journaled in a lug 43 formed integral with the lower end portion of the web 22, and the extension 41 is journaled in a lug 44 similar to the lug 43 and formed integral with the upper portion of the web 22. The extension 41 projects upwardly beyond the housing A and has its extreme upper end formed of square cross section, for a purpose hereinafter described.

The brake staff G is in the form of a vertically disposed rotatable shaft having a square socket member 45 at its lower end, adapted to receive the square upper end of the worm F. The staff G extends through the bracket 12 and has its upper end provided with the usual hand wheel 46 rigidly secured thereto in any suitable manner.

The release member H comprises a lever arm 47, having a short vertical shaft 48 rigidly secured thereto, the shaft 48 being provided with a square portion received in a correspondingly formed opening in one end of the lever and clamped in position by a nut 49. At its lower end, the shaft 48 is provided with a square socket 50 adapted to receive the upper square portion of the projection 41 of the clutch shift member E.

The brake drum B is operably connected with the brake mechanism proper by means of a chain 50 having one end thereof secured to the brake mechanism proper and the other end anchored to the drum by means of the bolt 51.

The normal position of the parts is that shown in Fig. 2, the clutch D being in driving engagement with the worm wheel C. The operation of the improved mechanism shown in Figs. 1, 2 and 3 is as follows. To tighten the brakes, the hand wheel 46 is rotated in a clockwise direction, thereby rotating the worm F and the worm wheel C in a clockwise direction also, and through the clutch D, which is at this time in engagement with the clutch teeth on the worm wheel C, rotating the brake drum B in a direction to wind the chain 50 thereon and tighten the brakes. It will be evident that when the brakes have been tightened, the same will be held in the set position due to the friction existing between the worm wheel C and the worm F, which will effectively prevent the brake drum rotating in a direction to unwind the chain.

To release the brakes, the lever 47 is pulled outwardly away from the wall 10 of the car, that is, the same is operated so as to rotate the shaft 48 in a clockwise direction, thereby sliding the clutch member D away from the worm wheel C and disengaging the teeth thereof and releasing the brakes by permitting the drum to rotate in a chain unwinding direction. It will be evident that as soon as the handle 47 is released, the spring 32 will force the clutch member D toward the worm wheel C, causing the teeth thereof to re-engage so that the mechanism is ready for the next application of the brakes.

Referring next to the construction illustrated in Figs. 4, 5 and 6, 110 denotes the end wall of a gondola freight car, 111 the usual brakeman's platform, suitably supported by brackets secured to the end wall 110, and 112 the upper bracket for the brake mechanism.

The embodiment of the invention illustrated in Figs. 4, 5 and 6 comprises broadly a housing A'; a brake drum B'; a worm wheel C'; a clutch member D'; a clutch shifting member E'; a worm F'; a brake staff G'; a release member H'; a supporting bracket J'; and a shaft K'.

The bracket J' comprises a plate 160 and a pair of bearing members 161 and 162 at opposite ends of the plate, the members 161 and 162 being each provided with lateral flanges at the base portions thereof, adapted to receive the bolts 163 extending through the plate 160 and the end wall 110 of the car. The shaft E' has its opposite ends rotatably mounted, respectively, in the bearings 161 and 162, the drum B' being keyed directly to the shaft K', adjacent the bearing 161.

The clutch member D', which is in all respects similar to the clutch D of the form hereinbefore described, is slidably mounted on the shaft K' adjacent the bearing 162, being splined thereto by keys 127—127. The clutch member D' co-acts with a spring 132 operating similarly to the spring 32 received in a recess 133 formed on the inner side of the bearing member 162, the recess being of such a size as to also slidingly receive the adjacent end of the clutch member.

The housing A' is in the form of a rectangular box closed by a cover plate 123, the same being secured to the housing by means of cap screws or any other suitable fastening devices. The rear wall of the housing is adapted to abut the outer face of the plate 160 and is thus prevented from rotating with the shaft K' and worm wheel C'. The worm wheel C' is disposed within the housing A' and is mounted on the shaft K' for free rotation thereon. The worm wheel C' is also provided with clutch teeth 128, in all respects similar to the teeth 28 of the clutch C, co-acting with the clutch member D'. The worm F' has its upper and lower ends rotatably mounted in the upper and lower walls of the housing A' and the upper bearing member thereof is extended upwardly above the upper wall of the housing, having the end portion formed of square cross section similarly to the worm F and adapted to co-act with the brake staff G' in a similar manner.

The clutch shift member E' is in all respects similar to the member E previously described, being in the form of a fork having cylindrical projection 139 engaging within the peripheral groove 140 of the sliding clutch member D', and being pivotally mounted by trunnions extending from the upper and lower arms thereof journaled in lugs 164 extending respectively from the top and bottom of the housing A'. The trunnion projecting from the upper arm is extended upwardly above the housing A', has the free end thereof formed of square cross section, and is adapted to co-act with the release member H'.

The brake staff G' and the release member H' are in all respects similar to the brake staff G and the release member H, hereinbefore described, operate in a similar manner, and are rotatably mounted in the bracket 112.

The operation of the construction shown in Figures 4, 5, and 6 is similar to the operation of that previously described, with the exception that the shaft on which the clutch member and drum are mounted is rotatable instead of being fixed, and that the clutch member D' and the drum B' are fixed thereto for rotation therewith.

I have herein shown and described what I now consider the preferred manner of carrying out the invention, but the same is merely illustrative and I contemplate all changes and modifications that come within the scope of the claims appended hereto.

I claim:

1. In a hand brake, the combination with a drum upon which the brake chain is adapted to be wound; of operating means for said drum, including a worm and worm wheel; automatically operated means for connecting said operating means to the drum; and manually operated means movable independently of said first named means for disengaging said automatically operated means from the drum to release the brakes.

2. In a hand brake, the combination with a drum upon which the brake chain is adapted to be wound; of worm means for operating the same; a clutch movable relatively of said drum and worm means for operatively connecting said worm means to said drum; and means for operating said clutch.

3. In a hand brake, the combination with a drum upon which the brake chain is adapted to be wound; a rotary brake staff; a worm operatively connected to said shaft; a worm wheel co-acting with said worm; a spring pressed clutch adapted to normally connect said drum and wheel for simultaneous rotation; and a manually operated release lever co-acting with said clutch for disengaging the same.

4. In a hand brake, the combination with means for taking up the brake chain to tighten the brakes; of a worm and worm wheel constructed for detachably receiving a brake staff; a clutch member automatically actuated for connecting said worm and worm wheel with said means; and a release lever for shifting said clutch to disconnect said means from said worm and wheel to thereby release the brakes.

5. In a hand brake, the combination with means for taking up the brake chain to tighten the brakes; of a worm and worm wheel; means for operatively coupling said worm wheel to said means; and means for disconnecting said coupling means to release the brakes, said disconnecting means and said worm being provided with extensions adapted to detachably receive, respectively, an operating lever and a brake staff.

6. In a hand brake, the combination with a housing; of a horizontally disposed shaft within said housing; a brake drum on said shaft; a worm wheel also mounted on said shaft; a clutch member slidable on said shaft for connecting said drum and wheel for rotation in unison; a vertically disposed worm for operating with said worm wheel; a clutch shifting member; and means on said clutch shifting member and worm adapted to detachably receive, respectively, a release lever and a vertical brake staff.

In witness that I claim the foregoing I have hereunto subscribed my name this 19th day of July 1923.

JOHN F. O'CONNOR.